(12) United States Patent
Srinivas et al.

(10) Patent No.: US 11,934,456 B2
(45) Date of Patent: Mar. 19, 2024

(54) UNIFIED KNOWLEDGE GRAPHS

(71) Applicant: INTUIT INC., Mountain View, CA (US)

(72) Inventors: Sudhir Srinivas, Fremont, CA (US); Kevin Geraghty, Dublin, CA (US)

(73) Assignee: Intuit, Inc., Mountain View, CA (US)

( * ) Notice: Subject to any disclaimer, the term of this patent is extended or adjusted under 35 U.S.C. 154(b) by 132 days.

(21) Appl. No.: 16/270,928

(22) Filed: Feb. 8, 2019

(65) Prior Publication Data

US 2020/0257730 A1 Aug. 13, 2020

(51) Int. Cl.
*G06F 16/901* (2019.01)
*G06F 16/28* (2019.01)
*G06N 20/00* (2019.01)

(52) U.S. Cl.
CPC ........ *G06F 16/9024* (2019.01); *G06F 16/284* (2019.01); *G06N 20/00* (2019.01)

(58) Field of Classification Search
CPC .... G06F 16/9024; G06F 16/284; G06N 20/00
USPC ......................................................... 707/798
See application file for complete search history.

(56) References Cited

U.S. PATENT DOCUMENTS

| | | | | |
|---|---|---|---|---|
| 5,740,267 | A * | 4/1998 | Echerer ................. | G06T 7/0012 382/284 |
| 9,336,311 | B1 * | 5/2016 | Amarilio ............. | G06F 16/9535 |
| 9,424,668 | B1 * | 8/2016 | Petrou ................... | G06T 11/206 |
| 9,836,183 | B1 * | 12/2017 | Love ..................... | G06F 16/904 |
| 10,621,368 | B2 * | 4/2020 | Ravizza ............... | G06F 16/9024 |
| 2005/0050068 | A1 * | 3/2005 | Vaschillo ................ | G06F 16/25 |
| 2007/0168334 | A1 * | 7/2007 | Julien ................... | G06F 16/284 |
| 2009/0144319 | A1 * | 6/2009 | Panwar ................... | G06F 16/25 707/999.102 |
| 2013/0185300 | A1 | 7/2013 | Kobayashi | |
| 2014/0098101 | A1 | 4/2014 | Friedlander et al. | |
| 2014/0280224 | A1 | 9/2014 | Feinberg et al. | |
| 2015/0095303 | A1 * | 4/2015 | Sonmez .................... | G06N 5/01 707/707 |
| 2017/0169092 | A1 * | 6/2017 | Baird ................... | G06F 16/2365 |
| 2018/0174059 | A1 * | 6/2018 | Banerjee ................ | G06N 5/025 |

(Continued)

FOREIGN PATENT DOCUMENTS

WO 2013-101490 A1 7/2013

*Primary Examiner* — Sherief Badawi
*Assistant Examiner* — Earl Levi Elias
(74) *Attorney, Agent, or Firm* — Patterson + Sheridan, LLP (57) ABSTRACT

Certain aspects of the present disclosure provide techniques for generating a unified knowledge graph. In one example, a method includes receiving entity data from a data source comprising a plurality of entities; forming a plurality of type-specific groups of entity data based on the received entity data; for each respective type-specific group of entity data of the plurality of type-specific groups of entity data; disambiguating the entity data within the respective type-specific group of entity data; creating a plurality of entity relationships based on the disambiguated entity data; and exporting the plurality of entity relationships to a type-specific subgraph; and forming a unified knowledge graph based on a plurality of type-specific subgraphs, wherein each type-specific subgraph of the plurality of type-specific subgraphs is associated with a single type-specific group of entity data of the plurality of type-specific groups of entity data.

20 Claims, 5 Drawing Sheets

(56) References Cited

U.S. PATENT DOCUMENTS

2019/0236215 A1* 8/2019 Agarwal ............ G06F 7/14
2019/0394225 A1* 12/2019 Vajipayajula ....... G06F 16/9024

* cited by examiner

UNIFIED KNOWLEDGE GRAPHS

INTRODUCTION

Aspects of the present disclosure relate building unified knowledge graphs.

Organizations frequently rely on graph databases to capture relationships within their customer bases. Similarly, organizations that provide applications and application services to their customers (e.g., application users) may use graph databases to organize users' data and to provide improved application services.

In a graph database structure, various entities (e.g., vendors, merchants, employees, etc.) may be a node and each relationship between entities may be represented by an edge between the entities' nodes. As graphs grow in entity and relationship (i.e., node and edge) count, the complexity of the graph increases rapidly. Consequently, discovering relationships in the graph database becomes significantly more difficult as the graph grows. Because many organizations already maintain massive graph databases, with entity counts in the millions or even higher, many organizations are already unable to effectively leverage their graph databases to discover new relationships that may be used to promote business, offer new services, etc.

Conventional methods of discovering relationships in graph databases include utilizing simple matching algorithms to identify relationships and manually reviewing matches to confirm those relationships. But with graph databases reaching hundreds of millions of entities, the computational load of simple comparison techniques renders the task intractable, not to mention the impossibly long time it takes for a human review of the pending discoveries.

Accordingly, what is needed are improved graph database structures that facilitate relationship discovery while improving performance characteristics when interacting with the graph database structure.

BRIEF SUMMARY

Certain embodiments provide a method for generating a unified knowledge graph, including: receiving entity data from a data source comprising a plurality of entities; forming a plurality of type-specific groups of entity data based on the received entity data; for each respective type-specific group of entity data of the plurality of type-specific groups of entity data: disambiguating the entity data within the respective type-specific group of entity data; creating a plurality of entity relationships based on the disambiguated entity data; and exporting the plurality of entity relationships to a type-specific subgraph; and forming a unified knowledge graph based on a plurality of type-specific subgraphs, wherein each type-specific subgraph of the plurality of type-specific subgraphs is associated with a single type-specific group of entity data of the plurality of type-specific groups of entity data.

Other embodiments provide systems for performing methods for disambiguating graph data, such as the aforementioned method. Yet other embodiments provide a non-transitory computer-readable medium comprising instructions for performing methods for disambiguating graph data, such as the aforementioned method.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer readable mediums for creating unified knowledge graphs.

A graph database organizes data using graph structures, such as nodes, edges, and properties of the nodes and edges.

Nodes may represent entities such as people, businesses, accounts, events or any other discrete instance. In some cases, nodes are referred to alternatively as vertices or entities of the graph structure.

Edges, also referred to as graphs or relationships, connect nodes to other nodes (often depicted as lines between nodes), and represent the relationship between them. The relationships allow data in the graph database structure to be linked together directly, and in many cases retrieved with fewer operations as compared to conventional database structures.

Edges may either be undirected or directed. In an undirected graph, an edge from a node to another node may have a single meaning, whereas in a directed graph, the edges connecting two different nodes have different meanings depending on their direction. Thus, edges are a key concept in graph databases, representing an abstraction that is not directly implemented in a relational model or a document-store model.

Properties may be information about or otherwise relevant to nodes and/or edges. In some cases, properties may be referred to as attributes, features, or metadata associated with the nodes and/or edges. For example, a node representing a business entity may include many properties, such as "name", "address", "notes", etc. Similarly, an edge between a customer node and the business node also include properties, such as a specific ID relating the two entities, a directionality of the relationship, a date upon which the relationship was established, and others.

Querying relationships within a graph database is generally fast because they are inherently stored within the structure of the graph database. Further, relationships between entities (e.g., nodes) in graph databases can be intuitively visualized, making it useful for heavily interconnected data. More generally, meaningful patterns may emerge when examining the connections and interconnections of nodes, properties, and edges.

Graph databases may be used by organizations to offer services to application users. For example, graph databases may help an organization create connections between users (e.g., between small businesses using related financial management applications), which may lead to collaboration, new business opportunities, etc. Such services provide significant value to application users and thus significant business opportunity for application providers.

Networks maintained by users (e.g., users' contacts) are particularly valuable because of their ability to scale exponentially—the so-called "network effect". However, this same aspect means that processing the data structures, such as graph databases, that embody the various users' networks is computationally complex and time consuming.

Described herein is a method for building unified knowledge graphs, which improve upon the performance of conventional graph structures (e.g., in terms of size, complexity, and discoverability of relationships, while maintaining all of the inherent data of conventional graph structures. Unified knowledge graphs are particularly useful for discovering new relationships and networks of users owing to their simultaneous reduction of redundant nodes and maintenance of context-specific nodes for entities. The method generally includes collecting entity data from disparate sources, filtering the entities (represented in the entity data) by type, disambiguating type-specific entities to form type-specific subgraphs, consolidating relationships based on the type-specific subgraphs, and creating a unified knowledge graph based on the consolidated relationships from the type-specific subgraphs. As described in more detail below, the unified knowledge graph's unique structure allows for improved relationship discovery as well as improved size and processing efficiency.

Example Graph Database Structure

Figure 1:
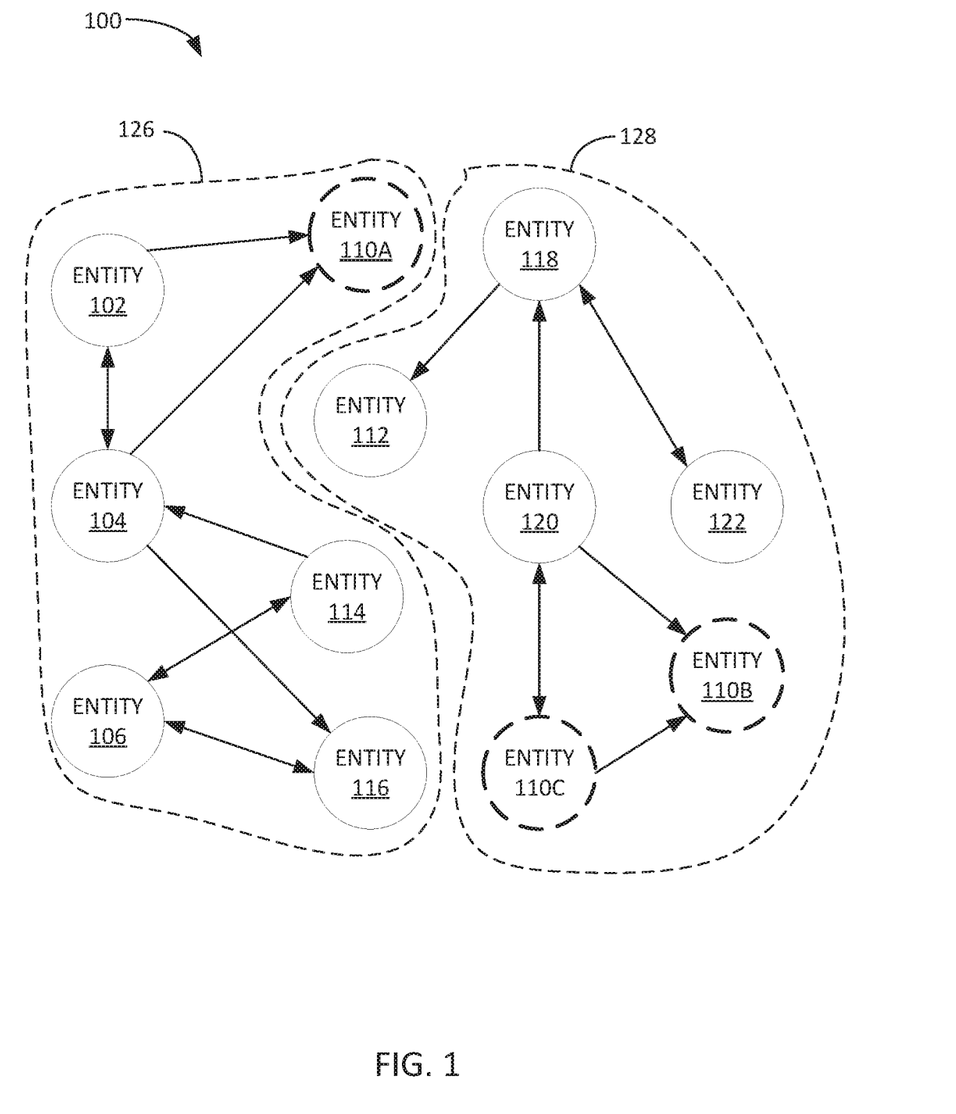
FIG. 1 depicts an example graph database structure.

FIG. 1 depicts an example graph database structure 100. In this example, there are twelve nodes (entities 102-122) connected by a variety of edges indicating relationships between the nodes. Though a very simple example, FIG. 1 demonstrates the complexity of even a small graph database structure in terms of the number of relationships created by only a few entities.

In graph database structures used by organizations, there are often thousands, millions, or even billions of entities and even more relationships. Because many or all of these relationships may be processed during queries of graph databases, such as graph database structure 100, it is critical that the graph database structure is both accurate (e.g., in terms of having accurate entity data and relationship data) and as compact as possible (e.g., by reducing redundant entities, relationships, etc.).

Graph database structure 100 depicts an example of a redundancy in that entities 110A, 110B, and 110C all refer to the same entity, but nevertheless exist as multiple different entities in graph database structure 100. In this example, entities 110A and 110B exist in separate subgraphs 126 and 128 of the overall graph structure 100, wherein in this example a subgraph is a group of entities in graph database structure 100 that is not connected via any edge to another one or more (e.g., another group) of entities in graph database structure 100. This may be caused, for example, by entities 110A and 110B existing in different "roles" in each subgraph, such as entity 110A being a supplier in the context of subgraph 126 and a buyer in the context of subgraph 128. Unfortunately, queries of the graph database structure 100 with respect to entity 110A may not identify all of the relationships of entity 110B and vice versa. Accordingly, it would be beneficial to discover the relationship between entities 110A and 110B, even if there is value in having them exist in different subgraphs.

Graph database structure 100 depicts another example of redundancy between entities 110B and 110C. In this example, entities 110B and 110C again refer to the same entity, but they are in the same subgraph 128. Thus, in this particular example, there is no additional value from having both entities, and, instead, the number of structures in graph database structure 100 is unnecessarily increased by maintain both entities and their respective relationships. For example, in this case, the relationship between entity 120 and 110C and entity 120 and 110B is really the same relationship. Accordingly, it would be beneficial to disambiguate entities 110B and 110C.

Redundant entities 110A, 110B, and 110C may come about by a variety of circumstances. For example, a changed property of an entity (e.g., a changed address after a recent move) may not be picked up by all nodes with a relationship to that entity right away. Thus, if a node creates a new relationship with a particular entity, but using a new address, that may create an entirely new node in a graph database rather than an association with the existing node. As another example, a missing attribute value (e.g., a missing component of an address, such as a suite number) may cause the same problem. As yet another example, a simple error in a data entry for a node attribute (e.g., a misspelling) may cause the same problem. As yet another example, abbreviations, truncations, or substitutions (e.g., "R." for Robert, "Rob" for Robert, or "Bob" for Robert) may cause the same problem. As yet another example, data formatting (e.g., a zip code formatted as "#####" versus #####-####, or a state referred to as "California" versus "CA") may cause the same problem. As yet another example, inherent entity ambiguity (e.g., two contacts with the same first and last name, or two businesses with the same name, but otherwise unrelated) may cause the same problem. Notably, these are just some of the examples and many others exist.

Example System for Creating a Unified Knowledge Graph

Figure 2:
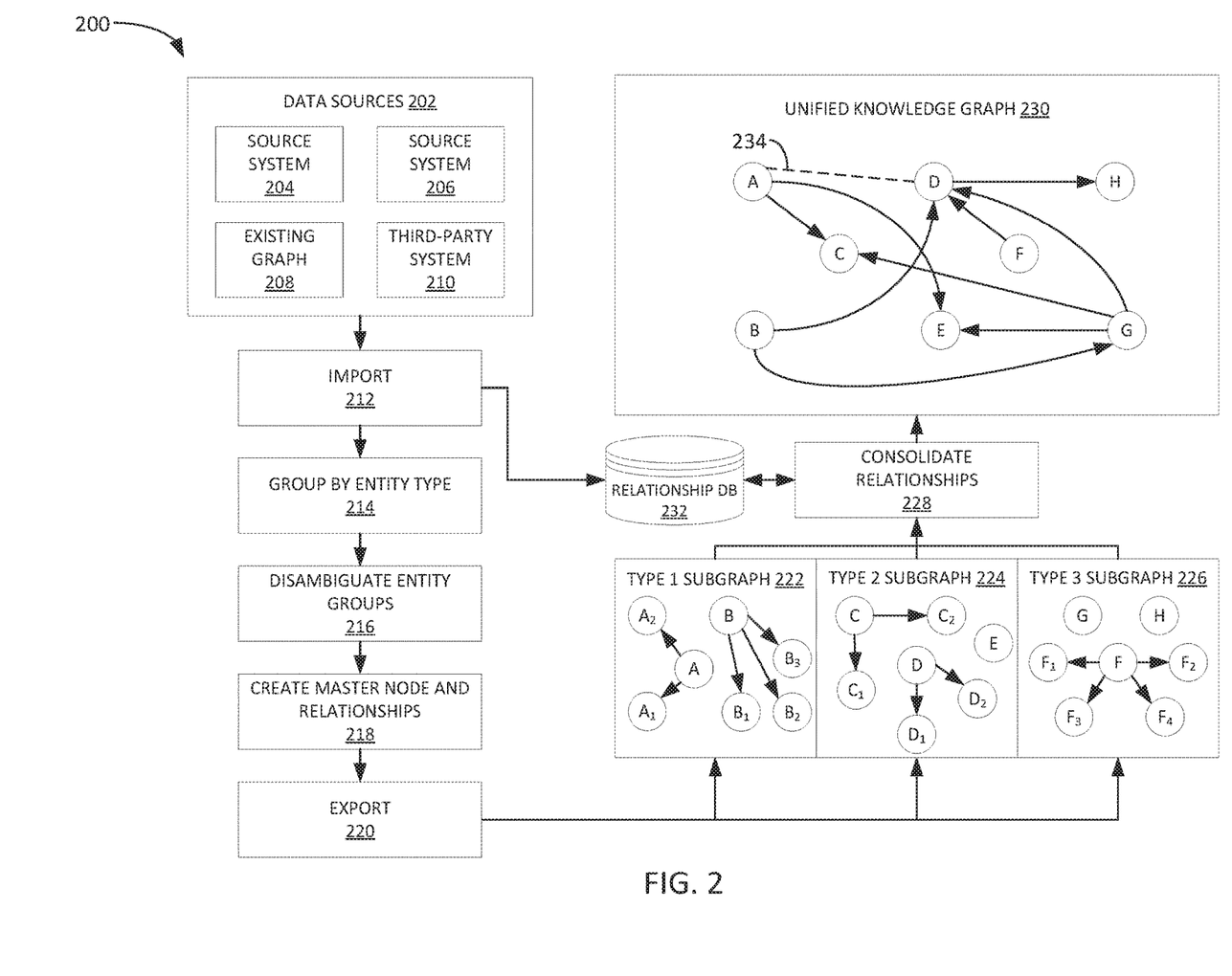
FIG. 2 depicts an example system for creating a unified knowledge graph.

FIG. 2 depicts an example system 200 for creating a unified knowledge graph, such as unified knowledge graph 230.

Key to the ability to build rich graph databases is the ability to ingest data from many data sources 202. In this example, data sources 202 include source system 204 and source system 206, which may be, for example, applications, existing data stores, databases, application-specific data structures, or other data repositories maintained by an organization. Notably, while source systems 204 and 206 may be created and maintained by the same organization, they may nevertheless be very different in form and function. For example, some of the ambiguities discussed above may be inherent to different source systems, such as where source system 204 stores a "state" attribute as a two letter abbreviation (e.g., "CA") while source system 206 stores the "state" attribute as a full length name (e.g., "California").

Data sources 202 also include one or more existing graph databases 208. For example, a graph database such as depicted in FIG. 1, may serve as a starting point for building a unified knowledge graph (e.g., 230).

Data sources 202 also includes one or more third-party systems or databases 210 or other sorts of data repositories. For example, an organization may have access to third-party databases through application programming interfaces (APIs), shared data channels, shared data repositories, purchased or licensed data sets, or the like.

Notably, the composition of data sources depicted in FIG. 2 is just one example, and any number or type of data source may be imported. Indeed, data sources 202 may be a dynamic mixture of incoming new data sources and outgoing old data sources as data is integrated into type-specific graphs 222, 224, and 226 and unified knowledge graph 230. Thus, more generally speaking, data sources 202 may provide a heterogeneous set of data that is not consistently structured, not clean, and not complete.

Entity data from data sources 202 may be imported at 212 (e.g., by an importing component as in FIG. 5) in one or more native formats and converted to a standardized format for further processing.

For example, the ingested data may be "cleaned", which may refer to identifying incomplete, incorrect, inaccurate or irrelevant parts of the data and then replacing, modifying, or deleting the "dirty" data. For example, data may be cleaned by removing stop words from a stop word dictionary, removing unsupported or unwanted symbols, fixing misspellings, performing stemming, etc.

Further the ingested data may be normalized so that various attributes are consistently maintained between entities. For example, word replacement may be used to normalize different forms of the same underlying word (e.g., "Incorporated" for "Inc." or "it is" for "it's", etc.). Or, as another example, abbreviations, such as "CA", may be replaced with full words, such as "California".

In some cases, importing entity data at 212 may include changing the character of the underlying data, such as the format, file type, encryption type, compression type, etc.

As another example, importing entity data at 212 may include disassembling existing combined data structures into component data structures so that the further processing is performed on discrete data units. For example, a source database may be processed one row at a time.

As yet another example, importing entity data at 212 may include standardizing imported attributes or fields based on recognized attribute types. For example, address attributes may be passed through an address standardizer/geocoding process that ensures the resulting attribute data adheres to a standardized address format, which may include textual addresses or geographic coordinates as just a few examples.

Because of the potentially dynamic nature of data sources 202 (as described above), importing at 212 serves an important system function by avoiding the need to reconfigure further processing components for each new data source. Rather, further processing steps may be modularly added to system 200 and configured to accept standardized data output from the import process at 212.

While importing entity data at 212, relationships in the underlying data may be captured and recorded, such as in relationship database 232. For example, entity data may include contact records, sales receipts, invoices, payments, contracts, or other data that reflects relationships between that entity and other entities. Further, where data being imported is from an existing graph database, such as 208, entity data may include one or more existing relationships. Both existing and determined relationships may be captured in relationship database 232 as part of the importing process at 212.

Figure 5:
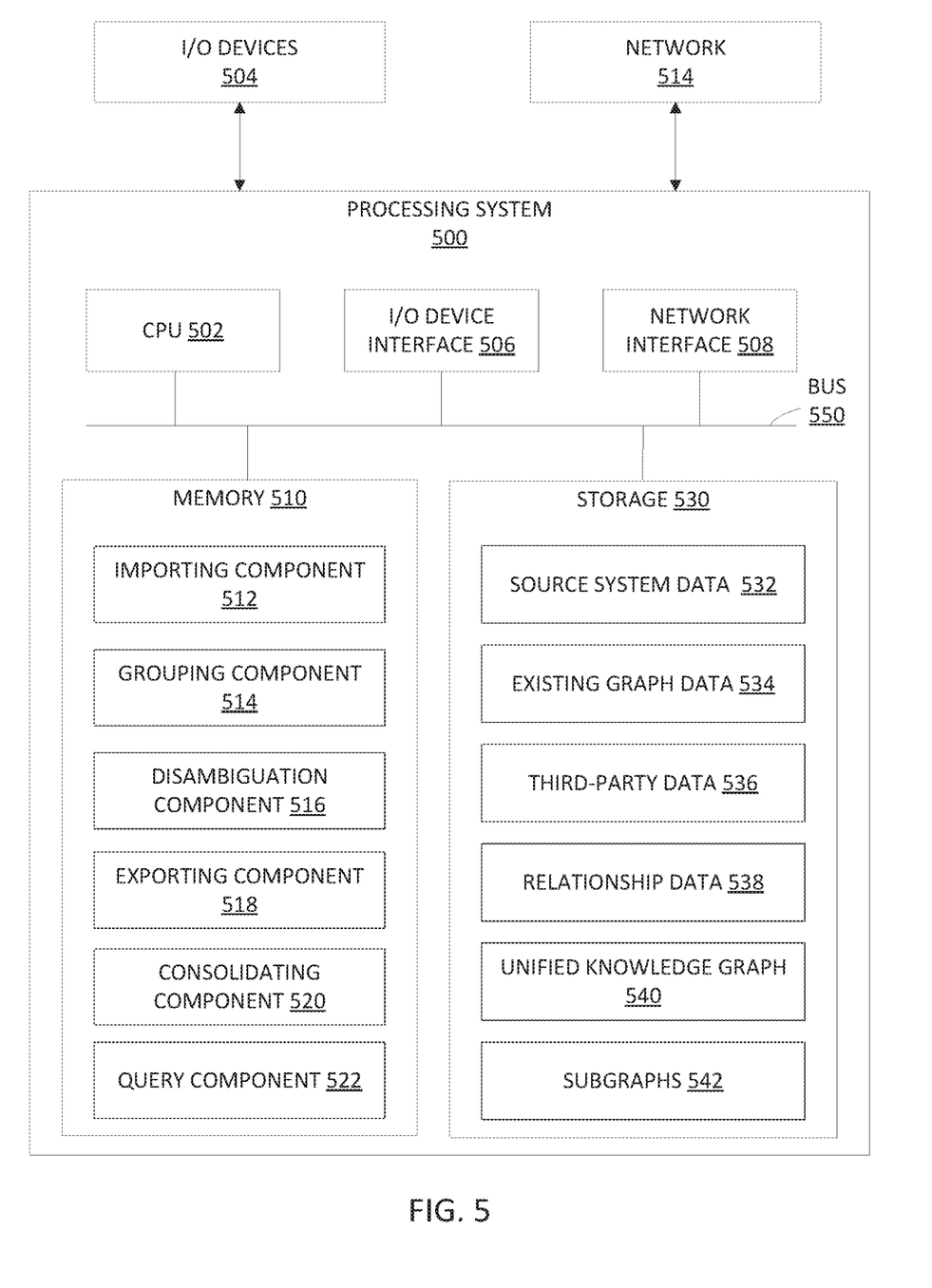
FIG. 5 depicts an example processing system for creating a unified knowledge graph.

Entity data imported at 212 is then grouped by entity type at 214 (e.g., by a grouping component as in FIG. 5). In some implementations, the imported entity data from data sources 202 includes labels regarding the entity type, such as company, vendor, customer, employee, merchant, buyer, seller, etc.

Further, entity types may be inferred from looking at relationship data. For example, an entity that sends invoices to other entities through a small business application may be deemed to be a merchant and entities that pay that entity through the same or a related application may be deemed to be customers of that entity. In other words, activity between entities that is captured in imported data may be used to determine entity type.

In some implementations, there may be more incoming entity types in the imported data than there are type-specific subgraphs, so grouping by entity type at 214 may further include mapping labels or otherwise determined entity types of imported data to a set of types that an organization uses to track entities.

Grouped entity data (e.g., grouped by entity type) may then be disambiguated at 216 to discover relationships within the grouped entity data.

In some implementations, disambiguation includes "blocking", which limits comparison of entity data by one or more identifiable common attributes. For example, blocking may limit the comparison of entities (e.g., businesses) by common cities (e.g., Mountain View). In this way, the number of pairwise comparisons between entities imported at 212 from data sources 202 may be beneficially limited thereby improving performance of system 200.

For example, consider an example where 1,000 business entities from each of 1,000 different cities (i.e., n=1,000,000 total business entities) need pairwise comparison. Without blocking, this requires $n^2$=1,000,000,000,000 (1 trillion) pairwise comparisons. Even with significant processing resources, this number of comparisons takes a significant amount of time to complete. For example, if each comparison takes 1 microsecond, then the 1 trillion comparisons will require 11.6 days to complete. By contrast, if blocking is implemented based on an attribute such as a common city i.e., where only businesses in the same cite are compared, then only 1,000,000,000 (1 billion) comparisons are needed. At the same sample speed as above (1 microsecond/comparison), the processing completes in 16 minutes. Thus, with blocking, the order of complexity gets divided by the number of blocks i.e., $$\frac{n^2}{k},$$

where k is the number of blocks. So, in this case $n^2$=1,000,000,000,000 (1 trillion) pairwise comparisons divided by k=1,000 blocks=1,000,000,000 (1 billion) resulting comparisons. Thus, blocking can significantly improve the performance of the underlying application as well as the efficiency of the processing system as a whole.

Notably, blocking can be implemented based on any common data attribute of the imported data (e.g., same site, same state, same name, same type, same category, same field, etc.), and in some cases may be applied to only subsets of the imported data where the common attribute exists.

In some implementations, the imported data may be partitioned or bucketed initially before blocking. For example, imported data may be bucketed based on hashes of the data and a MinHash method may be used for non-deterministic attributes, where MinHash (or the min-wise independent permutations locality sensitive hashing scheme) is a technique for quickly estimating the similarity of two sets of data. The buckets may be used as the basis for blocking as described above.

Blocked data sets (e.g., a set of entities all sharing a common characteristic, property, attribute, or the like) may then be matched by a matching component. Matching involves determining which entities match i.e., are the same entity despite existing as separate entities in the imported data. For example, matching may determine that "Bob's Submarine Shop" "Bob's Subs" and "Bob's Sub Sandwiches" all refer to the same entity.

Matching can be performed by a variety of methods, including probabilistic methods, such as machine learning methods, as well as deterministic methods, such pairwise comparison, for exact matches, edit distances (e.g., Levenshtein distance), ground truth knowledge, and the like. These different methods may be combined in some examples to improve the quality of the matching. In one implementation, similarity scores from multiple matching methods may input to a machine learning model to learn the best way to combine the scores based on a fully labeled "golden" data set where all the matches are known.

In some implementations, a first cut at matching entities in a blocked data set may include grouping like entities based on one or more matching attributes. For example, entities in a blocked data set may be grouped by location (e.g., neighborhood or zip code), by type (e.g., a type of business), by tax status (e.g., profit vs non-profit), and many other attributes. These initial groupings may improve overall matching by avoiding erroneous matches of very similar, but otherwise distinct entities. For example, different locations of the same business chain, which should be treated as distinct entities despite all their similarities, may be grouped apart based on neighborhood data.

Probabilistic matching methods, such as clustering algorithms (e.g., hierarchical clustering algorithms, centroid-based clustering algorithms, density-based clustering algorithms, and others) may be used to match entities as well, in some cases, a threshold based on the probabilistic method may be established to determine when a match is determined by that method.

In some examples, ensembles of probabilistic methods may be used, for example, to first cluster entities and then to refine the clusters by a second technique, such as measuring edit distances or applying another machine learning algorithm. This refinement may improve the likelihood that matched entities are indeed the same entity.

Disambiguation of grouped entity data may be carried out iteratively over all of the groups, or, for example, in parallel for each individual group.

The result of disambiguating a type-specific group of entity data may be that one or more subsets of the entities in the type-specific group are determined to be related. For example, referring back to FIG. 1, disambiguation of entities in subgraph 128 may determine that entities 110B and 110C are in fact the same entities.

At 218, then, a "master" or "prime" entity node may be created along with relationships to each of the related entities. For example, a master node for "Bob's Submarine Shop" may be created along with relationships to "Bob's Subs" and "Bob's Sub Sandwiches". In this way, the master or prime node connects (via relationship edges) all of the related entities. Note that in some cases, one of the existing related entities may be deemed the master or prime node, while in others, a completely new entity may be created, which consolidates some or all of the data in the nodes determined to be related through disambiguation.

At 220, the new entities and relationships are exported to type-specific subgraphs 222, 224, and 226. Exporting at 220 may include formatting entity and relationship data for compatibility with type-specific subgraphs 222, 224, and 226 as well as unified knowledge graph 230.

Each of the type-specific subgraphs (e.g., 222, 224, and 226) in FIG. 2 relate to a different type of entity. For example, type 1 subgraph 222 may be related to "merchants" and master node A may refer to "Bob's Submarine Shop" while related nodes $A_1$ and $A_2$ may refer to "Bob's Subs" and "Bob's Sub Sandwiches", respectively.

Note that because subgraphs 222, 224, and 226 are type-specific, "Bob's Submarine Shop" may exist in multiple subgraphs at once. For example, "Bob's Submarine Shop" may also be a "customer", which is the type associated with subgraph 224, and thus master node D may refer to "Bob's Submarine Shop" while related nodes $D_1$ and $D_2$ may refer to "Bob's Subs" and "Bob's Sub Sandwiches", respectively.

Note that while three different type-specific subgraphs are depicted in FIG. 2 (i.e., 222, 224, and 226), any number of type-specific subgraphs may be created depending on the different types of entities that an organization is interested in tracking.

Once all of the type-specific subgraphs have been populated with imported entity data from data sources 202, the relationships between the various entities in each subgraph may be consolidated at 228. For example, the relationships captured while importing entity data at 212 and stored in relationship database 232 may be used when consolidating relationships at 228 to build unified knowledge graph 230.

For example, the relationships associated with nodes $A_1$ and $A_2$ (which may have originated from existing graph 208 and been stored in relationship database 232), may be consolidated to master node A such that master node A can be inserted into unified knowledge graph 230 and represent all of the relationships of the related entities (e.g., A, $A_1$, and $A_2$) using a single node in unified knowledge graph 230. Thus, information in unified knowledge graph 230 is represented more efficiently (e.g., using one node versus two or three which saves memory space. As mentioned above, even though a node may be represented by a relatively small amount of memory (e.g., 10 kb), when there are a large number of nodes, the cumulative savings are significant.

For example, in FIG. 2, twenty entity nodes in subgraphs 222, 224, and 226 are represented in only eight master nodes in unified knowledge graph 230, representing a sixty percent savings in nodes (and thus memory space). Further yet, traversing unified knowledge graph 230 (e.g., in response to a query) will be faster due to the reduced number of entity nodes and relationship edges in unified knowledge graph 230, even though it is capable of representing all of the underlying information.

Note that in this example, unified knowledge graph 230 may still include multiple entity nodes that are related (e.g., A and D, which both refer to "Bob's Submarine Shop"), but now there is only one of each type-specific entity node in unified knowledge graph 230 (e.g., one for "Bob's Submarine Shop" as a merchant (A) and one for "Bob's Submarine Shop" as a customer (D)). Thus, significant space savings in the structure may be recognized without losing the context provided by nodes of different type relating to a single entity.

Further, in some implementations, an edge relationship may be created between related entity nodes of different types, such as relationship edge 234 between nodes A and D, which refer to "Bob's Submarine Shop" as a vendor and as a buyer, respectively. In this way, a direct path exists between the nodes of different type, but representing the same entity. This may improve the ability to discover relationships in unified knowledge graph 230 thereby solving one of the challenges discussed above with respect to FIG. 1.

As described above, type specific subgraphs 222, 224, and 226 maintain the relationships between the related entity nodes of each particular type. As relationships are consolidated at 228 to minimize redundant information in unified knowledge graph 230, relationship data may be accessed from relationship database 232. Notably, relationship database 232 also provides a way to reconstruct or recover all original relationship data.

For example, the relationship between A and C in unified knowledge graph 230 may originally be between A2 and C1. Relationship database 232 may store this information and provide it in response to a query when needed without the need to have A2 and C1 in unified knowledge graph 230, thus maintaining the performance benefits discussed above as well as all of the information from the originally imported data. An example of a relationship database is discussed below with respect to FIG. 3.

Further, in some implementations, relationships between related nodes of different types (e.g., "Bob's Submarine Shop" as a merchant (A) and "Bob's Submarine Shop" as a customer (D)) may be stored in relationship database 232 rather than implemented in relationship edges in unified knowledge graph 230. This may further reduce the number of edges necessary in unified knowledge graph 230 without losing the underlying information relating the entities. Thus, only when further detail is necessary might a user need to query relationship database 232 for additional relationship details.

Unified knowledge graph 230 may be used for many productive ends. Generally speaking, unified knowledge graph 230 may be used in the same way as other graph database structures, but the performance when accessing unified knowledge graph 230 will be improved due to, for example, it's more compact structure. For example, queries may be run against unified knowledge graph 230 (e.g., by query component 522 in FIG. 5) in order to return relationship information between entities, to determine groups of entities, etc. Also, results will be improved by virtue of unified knowledge graph 230's reduced entity and relationship redundancy. The results of querying unified knowledge graph 230 may be used by organizations to many productive ends.

In some cases, algorithms may be run on unified knowledge graph 230 in order to discover or infer additional relationships, patterns of activity, and the like. For example, graph algorithms may be used to discover new groups or "communities" of entities in unified knowledge graph 230, or new chains of commerce, and the like. In some cases, algorithms may be able to identify emerging markets between entities and allow an organization to decide to be an early entrant in that emerging market.

Further, unified knowledge graph 230 may be used to identify relationship attributes, such as persistent versus transient relationships in unified knowledge graph 230, and allow an organization to determine interrelationship opportunities between the entities with persistent relationships. These are just a few examples of the utility of unified knowledge graph 230.

Notably, without the efficiency improvements engendered by the structure of unified knowledge graph 230, in many cases existing algorithms will not finish in a practical amount of time for the results to be useful to an organization. For example, where a conventional graph database has billions of entities, a complex algorithm may take years to complete.

System 200 depicted in FIG. 2 is just one example, and other systems including additional or fewer components, and arranged differently than depicted in FIG. 2, are possible based on the systems and methods disclosed herein.

Example Relationship Database

Figure 3:
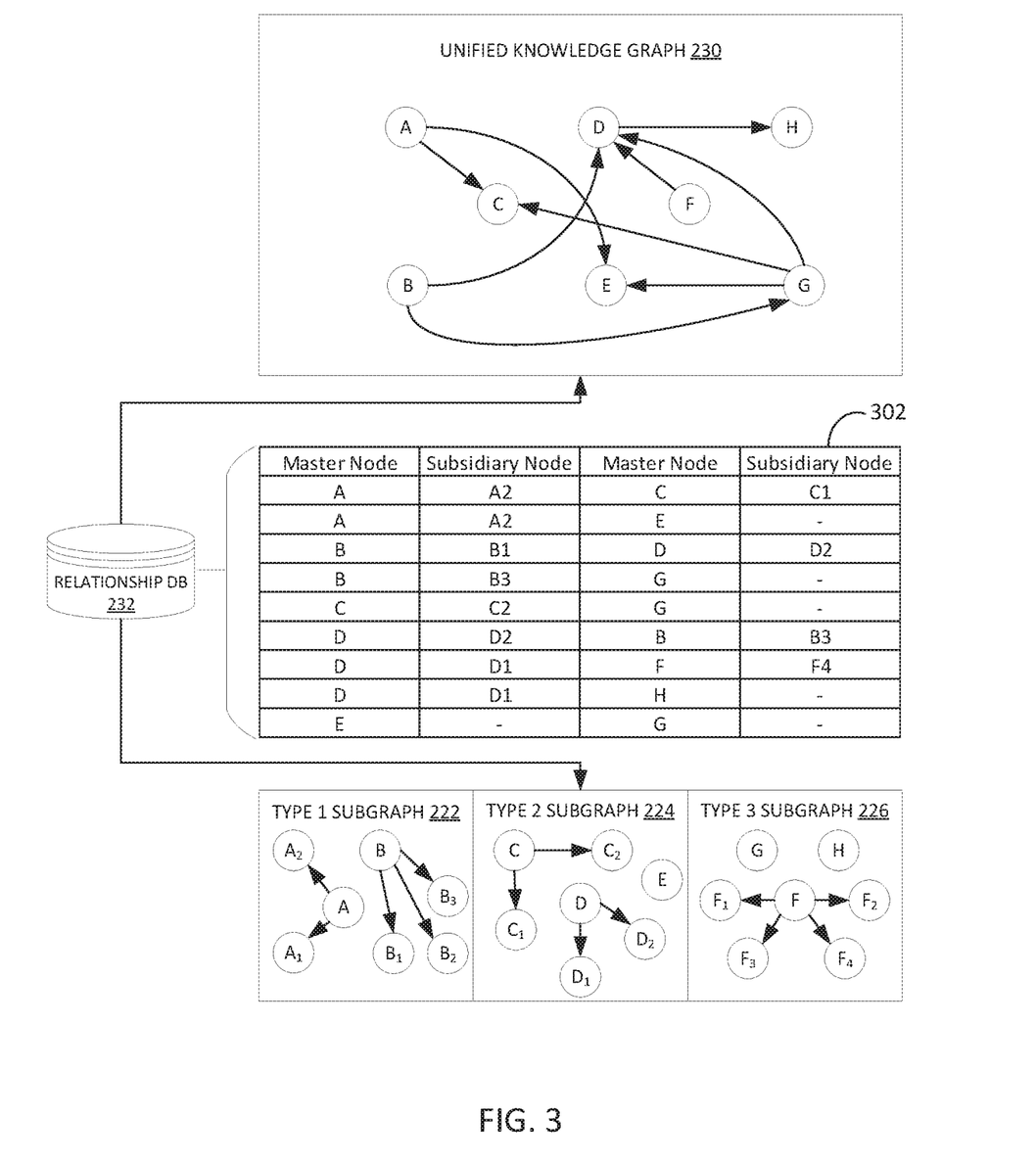
FIG. 3 depicts an example relationship database related to a unified knowledge graph.

FIG. 3 depicts an example relationship database 232, which includes a table 302 mapping entity nodes from unified knowledge graph 230 back to specific entities in type-specific subgraphs, such as 222, 224, and 226.

In the depicted example, relationship database 232 stores rows corresponding to relationships between original entities that, in some cases, are now subsidiary entities to master nodes via the type-specific subgraphs discussed above. For example, an original relationship may have been established in data from data sources 202 in FIG. 2, such as from existing graph 208.

As depicted in example table 302, the relationship between node A and node C in unified knowledge graph 230 is based on the underlying relationship between subsidiary node A2 and subsidiary node C1. Subsidiary node A2 is related to node A via subgraph 222 and subsidiary node C1 is related to node C via subgraph 224.

Thus, relationship database 232 may enable storage of additional, more granular relationship data that may not be necessary for the normal functions of unified knowledge graph 230. Thus, the performance of unified knowledge graph 230 may be improved without the loss of resolution in the data from a system perspective.

Moreover, in some implementations, relationship database 232 may preclude the need for storing subgraphs, such as 222, 224, and 226, after unified knowledge graph 230 has been formed. This yields yet additional storage and performance improvements to the system as a whole.

Note that table 302 may have other columns of data in other implementations, and the organization of the rows and columns may likewise be different. Further, in other implementations, relationship database 232 may comprise a different form of database than a table-based database, as in this example.

Example Method for Creating a Unified Knowledge Graph

Figure 4:
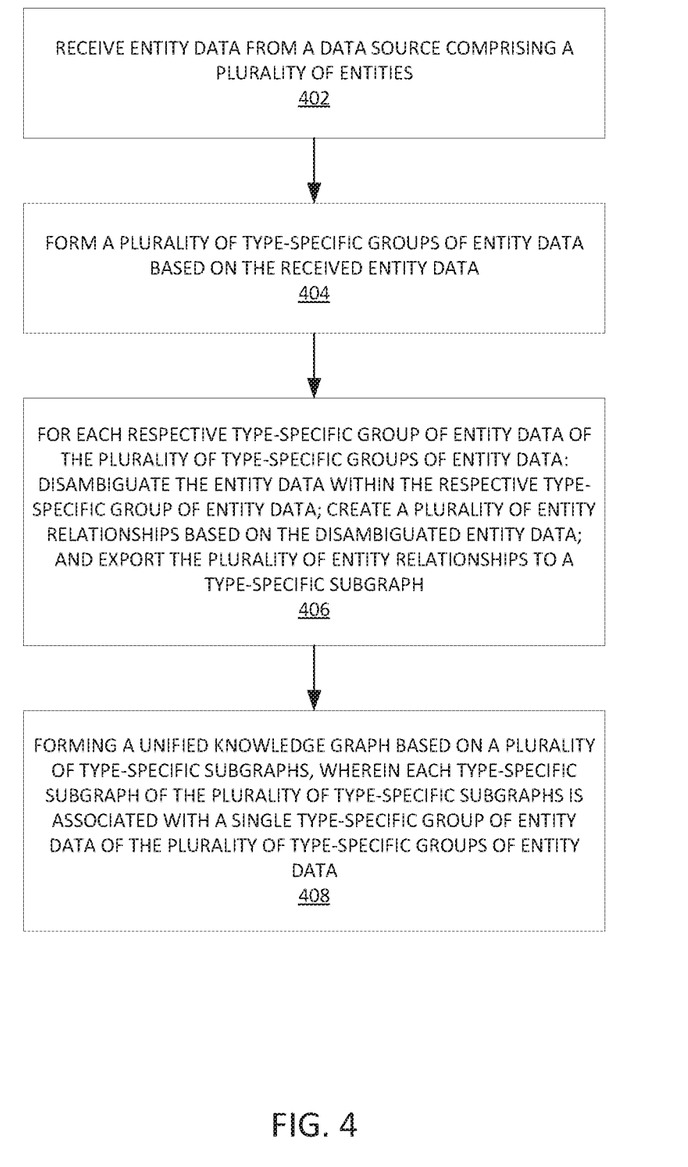
FIG. 4 depicts an example method for generating a unified knowledge graph.

FIG. 4 depicts an example method 400 for generating a unified knowledge graph.

Method 400 begins at 402 with receiving entity data from a data source comprising a plurality of entities. For example, the data source could be a source system, such as 204 and 206 in FIG. 2, or an existing graph, such as 208 in FIG. 2, or a third-party data system, such as 210 of FIG. 2, or combinations of the same.

Method 400 then proceeds to step 404 with forming a plurality of type-specific groups of entity data based on the received entity data.

In some implementations, forming a plurality of type-specific groups of entity data based on the received entity data includes determining a type for each respective entity of the plurality of entities based on a label associated with the respective entity. For example, the types may include: company, vendor, customer, employee, merchant, buyer, and seller. In other examples, determining a type for each respective entity of the plurality of entities may be based on relationship data that suggests a certain type of entity (e.g., merchant). These are just two examples and others exist.

Method 400 then proceeds to step 406 with, for each respective type-specific group of entity data of the plurality of type-specific groups of entity data: disambiguating the entity data within the respective type-specific group of entity data; creating a plurality of entity relationships based on the disambiguated entity data; and exporting the plurality of entity relationships to a type-specific subgraph. For example, the type-specific subgraph may be like type specific subgraphs 222, 224, and 226 described above with respect to FIG. 2.

In some implementations, disambiguating the entity data within the respective type-specific group of entity data includes determining a blocked data set from the entity data in the respective type-specific group of entity data based on a blocking parameter. In some implementations, the blocked data set comprises data regarding a first plurality of entities, and the first plurality of entities is a subset of a second plurality of entities represented in the respective type-specific group of entity data. In some implementations, disambiguating the entity data within the respective type-specific group of entity data further includes matching at least two entities in the first plurality of entities in the blocked data set.

In some implementations, matching the at least two entities in the first plurality of entities in the blocked data set includes matching the at least two entities based on at least one identical attribute associated with each entity. In some implementations, matching the at least two entities in the first plurality of entities in the blocked data set includes matching the at least two entities based on a machine learning algorithm. In some implementations, the machine learning algorithm is a clustering algorithm.

Method 400 then proceeds to step 408 with forming a unified knowledge graph based on a plurality of type-specific subgraphs, wherein each type-specific subgraph of the plurality of type-specific subgraphs is associated with a single type-specific group of entity data of the plurality of type-specific groups of entity data.

Though not depicted in FIG. 4, in some implementations, method 400 may further include consolidating relationships across the plurality of type-specific subgraphs. Method 400 may further comprise accessing a relationship database while consolidated relationship, such as described above with respect to FIG. 3.

Further, method 400 may include receiving a query for the unified knowledge graph and executing the query on the unified knowledge graph. Method 400 may further include providing results of the query of the unified knowledge graph in response to the received query.

Further, method 400 may include running a relationship discovery algorithm on unified knowledge graph, such as a graph algorithm, and determining at least one new relationship between entities in the unified knowledge graph.

Notably, method 400 is just one example, and other methods including additional or fewer steps, and steps in different order than depicted in FIG. 4, are possible based on the disclosed methods herein.

Example Processing System

FIG. 5 depicts an example processing system 500 for creating a unified knowledge graph. For example, processing system 500 may be configured to perform method 400 described above with respect to FIG. 4 as well as other operations described herein.

Processing system 500 includes a CPU 502 connected to a data bus 550. CPU 502 is configured to process computer-executable instructions, e.g., stored in memory 510 or storage 530, and to cause processing system 500 to perform methods as described herein, for example with respect to FIG. 4. CPU 502 is included to be representative of a single CPU, multiple CPUs, a single CPU having multiple processing cores, and other forms of processing architecture capable of executing computer-executable instructions.

Processing system 500 further includes input/output device(s) 504 and input/output interface(s) 506, which allow processing system 500 to interface with input/output devices, such as, for example, keyboards, displays, mouse devices, pen input, and other devices that allow for interaction with processing system 500.

Processing system 500 further includes network interface 508, which provides processing system 500 with access to external networks, such as network 514.

Processing system 500 further includes memory 510, which in this example includes a plurality of components.

For example, memory 510 includes importing component 512, which is configured to perform importing functions as described above (e.g., with respect to strep 212 in FIG. 2).

Memory 510 further includes grouping component 514, which is configured to perform grouping functions as described above (e.g., with respect to step 214 in FIG. 2).

Memory 510 further includes disambiguation component 516, which is configured to perform disambiguation functions as described above (e.g., with respect to step 216 in FIG. 2).

Memory 510 further includes exporting component 518, which is configured to perform exporting functions as described above (e.g., with respect to step 218 in FIG. 2).

Memory 510 further includes consolidating component 520, which is configured to perform consolidating functions as described above (e.g., with respect to step 220 in FIG. 2).

Memory 510 further includes query component 522, which is configured to perform queries of a unified knowledge graph, such as 540.

Note that while shown as a single memory 510 in FIG. 5 for simplicity, the various aspects stored in memory 510 may be stored in different physical memories, but all accessible CPU 502 via internal data connections, such as bus 550.

Processing system 500 further includes storage 530, which in this example includes source system data 532, which may be data provided by source systems such as 204 and 206 in FIG. 2.

Storage 530 further includes existing graph data 534, which may be data provided by an existing graph, such as existing graph 208 in FIG. 2.

Storage 530 further includes third-party data 536, which may include data from third-party systems or databases such as third-party system 210 in FIG. 2.

Storage 530 further includes relationship data 538, which may include data from a relationship database such as 232 in FIG. 2.

Storage 530 further includes unified knowledge graph 540, which may be similar to unified knowledge graph 230 described above with respect to FIG. 2.

Storage 530 further includes subgraphs 542, which may be similar to subgraphs 222, 224, and 226 described above with respect to FIG. 2.

As with memory 510, a single storage 530 is depicted in FIG. 5 for simplicity, but the various aspects stored in storage 530 may be stored in different physical storages, but all accessible to CPU 502 via internal data connections, such as bus 550, or external connection, such as network interface 508. Further, the various aspects stored in storage 530 may be loaded into memory 510.

Notably, the various aspects of processing system 500, including the components in memory 510 and the data in storage 530 are just one example, and many others are possible consistent with the methods and systems disclosed herein.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating a unified knowledge graph, comprising:
   receiving entity data from a data source comprising a plurality of nodes;
   forming a plurality of type-specific groups of nodes based on the received entity data;
   for each respective type-specific group of nodes of the plurality of type-specific groups of nodes:
      disambiguating the nodes within the respective type-specific group of nodes to identify one or more sets of related nodes representing a single entity within the respective type-specific group of nodes, wherein disambiguating the nodes comprises:
         determining a blocked data set from the entity data in the respective type-specific group of nodes based on one or more blocking parameters common to each member of the blocked data set and not associated with members of the respective type-specific group of nodes that are not included in the blocked data set; and
         refining the blocked data set based on a machine learning model trained to identify similar entities in the blocked data set;
      creating a master node representing the single entity for every set of related nodes of the one or more sets of related nodes;
      creating entity relationships between the master node for each respective set of related nodes and each of the nodes in the respective set of related nodes; and
      exporting the master node for every set of related nodes of the one or more sets of related nodes, the entity relationships, and the nodes within the respective type-specific group of nodes to a type-specific subgraph; and
   forming a unified knowledge graph based on a plurality of type-specific subgraphs, wherein,
      the unified knowledge graph is a queryable graph database and comprises only master nodes associated with each set of related nodes in each type-specific subgraph, and
      a number of nodes in the unified knowledge graph is less than a sum of the number of nodes in each type-specific subgraph.

2. The method of claim 1, further comprising:
   consolidating a plurality of entity relationships across the plurality of type-specific subgraphs; and
   creating a database entry in a relationship database relating to any consolidated relationship.

3. The method of claim 1, wherein forming the plurality of type-specific groups of nodes based on the received entity data comprises determining a type for each respective node based on a label of an associated entity.

4. The method of claim 1, wherein:
   the blocked data set comprises data regarding a first set of nodes,
      the first set of nodes is a subset of a second set of nodes represented in the respective type-specific group of nodes, and
      disambiguating the nodes further comprises matching at least two nodes in the first set of nodes in the blocked data set.

5. The method of claim 4, wherein matching the at least two nodes in the first set of nodes in the blocked data set comprises matching the at least two nodes based on at least one identical attribute associated with each node of the at least two nodes.

6. The method of claim 4, wherein matching the at least two nodes in the first set of nodes in the blocked data set comprises matching the at least two nodes based on a machine learning algorithm.

7. The method of claim 6, wherein the machine learning algorithm is a clustering algorithm.

8. A processing system, comprising:
   a memory storing computer-executable instructions;
   a processor configured to execute the computer-executable instructions and cause the processing system to perform a method for generating a unified knowledge graph, the method comprising:
      receiving entity data from a data source comprising a plurality of nodes;
      forming a plurality of type-specific groups of nodes based on the received entity data;
      for each respective type-specific group of nodes of the plurality of type-specific groups of nodes:
         disambiguating the nodes within the respective type-specific group of nodes to identify one or more sets of related nodes representing a single entity within the respective type-specific group of nodes, wherein disambiguating the nodes comprises:
   determining a blocked data set from the entity data in the respective type-specific group of nodes based on one or more blocking parameters common to each member of the blocked data set and not associated with members of the respective type-specific group of nodes that are not included in the blocked data set; and
   refining the blocked data set based on a machine learning model trained to identify similar entities in the blocked data set;
creating a master node representing the single entity for every set of related nodes of the one or more sets of related nodes;
creating entity relationships between the master node for each respective set of related nodes and each of the nodes in the respective set of related nodes; and
exporting the master node for every set of related nodes of the one or more sets of related nodes, the entity relationships, and the nodes within the respective type-specific group of nodes to a type-specific subgraph; and
forming a unified knowledge graph based on a plurality of type-specific subgraphs, wherein,
   the unified knowledge graph is a queryable graph database and comprises only master nodes associated with each set of related nodes in each type-specific subgraph, and
   a number of nodes in the unified knowledge graph is less than a sum of the number of nodes in each type-specific subgraph.

9. The processing system of claim 8, wherein the method further comprises:
consolidating a plurality of entity relationships across the plurality of type-specific subgraphs; and
creating a database entry in a relationship database relating to any consolidated relationship.

10. The processing system of claim 8, wherein forming the plurality of type-specific groups of nodes based on the received entity data comprises determining a type for each respective node based on a label of an associated entity.

11. The processing system of claim 8, wherein:
the blocked data set comprises data regarding a first set of nodes,
the first set of nodes is a subset of a second set of nodes represented in the respective type-specific group of nodes, and
disambiguating the nodes further comprises matching at least two nodes in the first set of nodes in the blocked data set.

12. The processing system of claim 11, wherein matching the at least two nodes in the first set of nodes in the blocked data set comprises matching the at least two nodes based on at least one identical attribute associated with each node of the at least two nodes.

13. The processing system of claim 11, wherein matching the at least two nodes in the first set of nodes in the blocked data set comprises matching the at least two nodes based on a machine learning algorithm.

14. The processing system of claim 13, wherein the machine learning algorithm is a clustering algorithm.

15. A non-transitory computer-readable medium comprising computer-executable instructions that, when executed by a processor of a processing system, cause the processing system to perform a method for generating a unified knowledge graph, the method comprising:
receiving entity data from a data source comprising a plurality of nodes;
forming a plurality of type-specific groups of nodes based on the received entity data;
for each respective type-specific group of nodes of the plurality of type-specific groups of nodes:
   disambiguating the nodes within the respective type-specific group of nodes to identify one or more sets of related nodes representing a single entity within the respective type-specific group of nodes, wherein disambiguating the nodes comprises:
      determining a blocked data set from the entity data in the respective type-specific group of nodes based on one or more blocking parameters common to each member of the blocked data set and not associated with members of the respective type-specific group of nodes that are not included in the blocked data set; and
      refining the blocked data set based on a machine learning model trained to identify similar entities in the blocked data set;
   creating a master node representing the single entity for every set of related nodes of the one or more sets of related nodes;
   creating entity relationships between the master node for each respective set of related nodes and each of the nodes in the respective set of related nodes; and
   exporting the master node for every set of related nodes of the one or more sets of related nodes, the entity relationships, and the nodes within the respective type-specific group of nodes to a type-specific subgraph; and
forming a unified knowledge graph based on a plurality of type-specific subgraphs, wherein,
   the unified knowledge graph is a queryable graph database and comprises only master nodes associated with each set of related nodes in each type-specific subgraph, and
   a number of nodes in the unified knowledge graph is less than a sum of the number of nodes in each type-specific subgraph.

16. The non-transitory computer-readable medium of claim 15, wherein the method further comprises:
consolidating a plurality of entity relationships across the plurality of type-specific subgraphs; and
creating a database entry in a relationship database relating to any consolidated relationship.

17. The non-transitory computer-readable medium of claim 15, wherein forming the plurality of type-specific groups of nodes based on the received entity data comprises determining a type for each respective node based on a label of an associated entity.

18. The non-transitory computer-readable medium of claim 15, wherein:
the blocked data set comprises data regarding a first set of nodes,
the first set of nodes is a subset of a second set of nodes represented in the respective type-specific group of nodes, and
disambiguating the nodes further comprises matching at least two nodes in the first set of nodes in the blocked data set.

19. The non-transitory computer-readable medium of claim 18, wherein matching the at least two nodes in the first set of nodes in the blocked data set comprises matching the at least two nodes based on at least one identical attribute associated with each node of the at least two nodes.

20. The non-transitory computer-readable medium of claim 18, wherein matching the at least two nodes in the first set of nodes in the blocked data set comprises matching the at least two nodes based on a clustering algorithm.

\* \* \* \* \*